Dec. 20, 1955 E. E. MARTIN 2,727,471
PRESSURE RESPONSIVE SEAL UNITS
Filed April 29, 1955
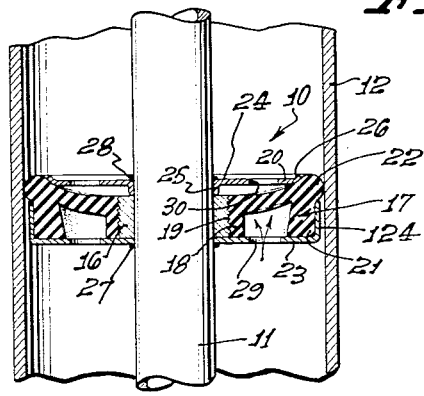
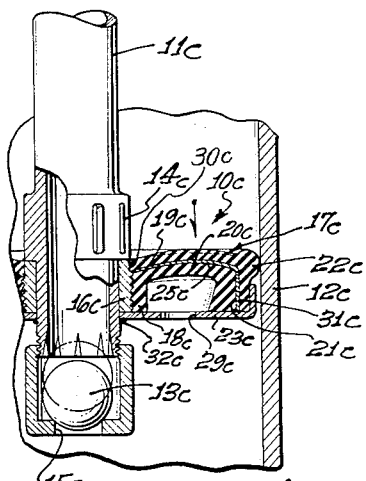
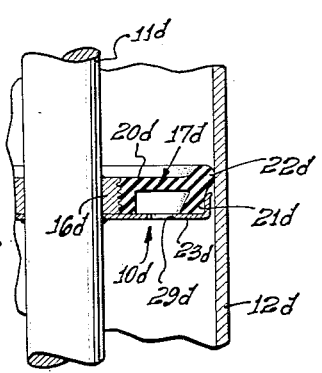
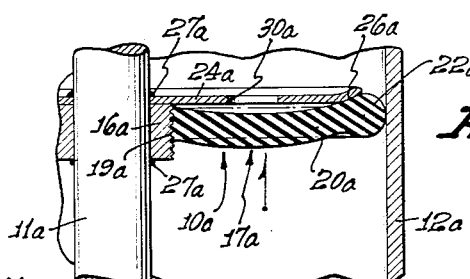
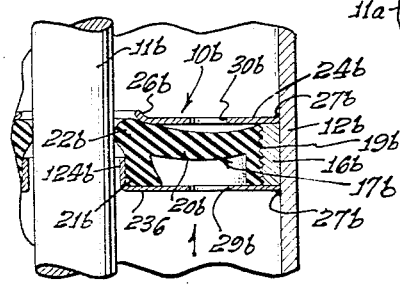
Earnest E. Martin,
INVENTOR.
BY William P. Green
ATTORNEY.

United States Patent Office 2,727,471
Patented Dec. 20, 1955

2,727,471
PRESSURE RESPONSIVE SEAL UNITS

Earnest E. Martin, Glendora, Calif., assignor to Ralph W. Walsh, Westminster, Calif.

Application April 29, 1955, Serial No. 504,760

17 Claims. (Cl. 103—225)

This invention relates to improved units for forming fluid tight seals between a pair of coacting members.

One important object of the invention is to provide an improved type of fluid seal which is adapted to automatically respond to the application of pressure against one of its sides in a manner increasing the effectiveness of the seal formed by the unit. In particular, the seal unit may be so designed as to normally engage the coacting seal surface or member very lightly, to thus allow easy initial movement of the seal unit to a desired position of use, while at the same time being capable, after the seal member is properly positioned, of responding to an increase in fluid pressure in a manner tightening the engagement between the sealed parts. This seal unit may serve any of various functions, as for instance for forming an annular seal between two strings of pipe or tubing in a well.

In order to achieve the above result, the unit includes a resiliently deformable body formed of elastomeric material and having an essentially radially extending wall whose axial flexure acts to vary the force with which a seal lip is urged against the coacting seal surface. Connected to one radial extremity of this wall, the body has a portion which is restrained against axial flexure, preferably by a suitable backing plate, and which carries the sealing lip. The radial wall is so designed that, when it is axially flexed by fluid pressure exerted against one of its sides, that flexure tends to increase the radial extent of the wall, and thus urge the lip radially against the coacting member. For this purpose, the radial wall may be curved or bowed as it extends radially outwardly, so that the fluid pressure will tend to decrease the curvature or bow and thereby urge the lip against the seal surface.

A further object of the invention is to provide an improved type of well swabbing device, for lifting fluid in a well, and in which the sealing engagement of the swab unit with the coacting tubing or casing is controlled by axial flexure of an elastic essentially radial wall of the swab. This feature of the invention has been disclosed to a certain extent but not claimed in my copending application Serial No. 486,618, filed February 7, 1955, on "Seals for Pistons, Fluid-Tight Joints and the Like," now Patent No. 2,709,118. It is contemplated that the swab may be so designed that the wall flexure will either tend to force the sealing lip tightly against the engaged tubing, or tend to pull the lip in a direction away from the tubing to prevent excessive friction, depending upon which effect is desired in a particular situation.

An additional feature of the invention has to do with the provision of a spring element in a unit of the above type to offer additional resistance to the axial flexure of the axially flexible wall. This element may be an essentially radially extending leaf spring embedded in the elastomeric material of the wall.

The above and other features and objects of the present invention will be better understood from the following detailed description of the typical embodiments illustrated in the accompanying drawing in which:

Fig. 1 is an axial section through a seal structure embodying the invention, and Figs. 2, 3, 4 and 5 are axial sectional views corresponding to Fig. 1, but showing four variational forms of seal.

The form of the invention shown in Figs. 1 to 3 comprises an annular fluid sealing unit 10 carried by and movable with a shaft 11, and acting to form an annular fluid tight seal between shaft 11 and an outer tubular member 12. The units 11 and 12 may be any of various types of parts between which a fluid tight seal is desired, and which may be relatively axially movable to a position in which unit 11 is received within unit 12. The seal unit 10 is especially effective for use in instances in which a greater fluid pressure is to be exerted against one axial side of the unit than against the other, the underside of the unit 10 being the higher pressure side in Fig. 1. Unit 10 is so designed as to utilize such fluid pressure at its underside for maximizing the sealing effectiveness of the unit.

Unit 10 includes a rigid inner ring or hub member 16 stationarily carried about shaft 11, and itself carrying an annular resiliently deformable seal body 17 formed of elastomeric material such as rubber. This rubber preferably has a hardness of between about 65 and 75 Shore, desirably about 70 Shore. Body 17 has a radially inner annular axially extending portion 18, which is bonded or vulcanized at its inner side to an outer irregularized surface 19 of ring 16. Projecting outwardly from the upper end of its inner portion 18, body 17 has a portion forming an essentially radially outwardly extending axially flexible annular wall 20, which is adapted to flex upwardly in response to the application of fluid pressure to its underside. This essentially radial wall 20 curves or is bowed progressively upwardly as it extends radially outwardly, to present a somewhat concave curving surface at its upper side, and a convex curving surface at its underside. As a result of this curvature, the upward flexure of wall 20 by fluid pressure at its underside tends to increase the radial dimension of wall 20, to thereby force its radially outer extremity toward outer tubular member 12.

Connected to the outer extremity of wall 20, body 17 has an integral annular portion 21 of increased axial thickness, which portion projects axially downwardly the same distance as inner portion 18 of the elastic body. Radially outwardly of portion 21, body 17 forms an annular sealing lip 22, which may be of the illustrated essentially circular cross-section, and which annularly engages the inner cylindrical surface of member 12 in fluid tight sealing relation. At its underside, unit 10 has a rigid preferably sheet metal annular plate 23, which extends directly transversely across the underside of the unit in engagement with ring 16 and portions 18 and 21 of body 17, and which has an outer annular axially turned flange portion 124 extending along the periphery of portion 21 of body 17, to confine that portion against radial expansion toward member 12.

At its upper side, unit 10 has a second transverse annular plate 24 for backing up body 17 when fluid pressure is applied to its underside. Plate 24 may have an inner tubular axially turned portion 25 received about shaft 11 in fixed relation thereto. From this axially turned portion, the rigid member 24 (preferably formed of sheet metal) may extend directly radially outwardly in axially spaced relation to the upper face of wall 20, and to a point of annular engagement at 26 with elastomeric body 17 at a location outwardly beyond wall 20 but inwardly of sealing lip 22. Preferably, backing plate 24 is turned annularly upwardly at the location 26, to provide a smooth rounded surface for engaging member 17. This engagement of backing plate 24 with body 17 at 26 restrains that portion of body 17 against upward axial flexure, so that wall 20 flexes considerably more than the portion of the body at location 26. Preferably, portion 21 of the elastomeric body is directly axially opposite the location 26. All of the parts of unit 10 may be retained at the illustrated locations on shaft 11 by welding of the two plates 23 and 24 to the shaft at 27 and 28. Each of the plates 23 and 24 contains a series of circularly spaced apertures 29 or 30 for allowing fluid communication through these plates to the opposite sides of flexible wall 20.

When the seal unit 10 of Figs. 1 to 3 is in use, with a relatively great fluid pressure being applied to its underside, that pressure tends to automatically urge lip 22 tightly against the wall of member 12 to at all times maintain a very effective fluid seal at the lip location. In particular, this result is achieved because the fluid pressure acts to flex wall 20 upwardly from its bowed condition to the more straight line position represented in broken lines in Fig. 1, while the radially outer portion of elastic body 17 is retained at 26 by backing plate 24 against corresponding upward flexure. Consequently, the upward flexure of wall 20 has the effect of tending to increase the radial dimension of that wall, that is, to move its radially outer extremity outwardly toward member 12, with the result that lip 22 is correspondingly urged outwardly against member 12 to assure maintenance of a most effective seal at the lip.

Fig. 2 represents a variational form of the invention which is somewhat similar to that of Figs. 1 to 3, except with respect to the manner of construction of the elastomeric body 17, and the elimination of the lower plate 23. In Fig. 2, the seal unit 10a is typically represented as being carried by a shaft 11a, for engagement with a tubular outer member 12a. Unit 10a includes an inner rigid ring 16a to which the inner extremity of annular elastomeric body 17 is bonded. Body 17 forms an essentially radially extending flexible wall 20a which is radially curved or bowed as shown to present an upper concave surface and a lower annularly convex surface. Member 17a is annularly engaged at 26a by a rigid backing plate 24a, apertured at several points 30a, to restrain upward axial flexure of body 17a at that location. Outwardly beyond point 26a, body 17a forms an annular sealing lip 22a, which annularly engages member 12a. Members 16a and 24a are rigidly retained in fixed relation to shaft 11a by welding at 27a.

In using the sealing unit of Fig. 2, fluid pressure is applied to the underside of the unit, and acts to flex the downwardly bowed wall 20a upwardly, while the body 17a is retained against corresponding flexure at outer location 26a. Thus, the upward flexure of wall 20a tends to urge the outer portion of that wall radially outwardly, to correspondingly tightly urge lip 22a against member 12a.

Fig. 3 illustrates another variational form of the invention, which is similar to that of Fig. 1 except that annular seal unit 10b is rigidly carried by outer tubular member 12b, and acts to form a seal with an inner externally cylindrical shaft or other member 11b. Unit 10b includes a rigid outer ring 16b, to the inner surface of which a radially outer portion of elastomeric body 17b is bonded. As in the other forms of the invention, body 17b has an essentially radially curved or bowed upwardly flexible wall 20b. At the inner extremity of this flexible wall, body 17b has an annular downwardly projecting portion 21b, across the underside of which there extends a transverse plate 23b apertured at 29b. Plate 23b may have a radially inner flange 124b for confining portion 21b against inward movement into engagement with shaft 11b. At its upper side, unit 10b includes a transverse backing plate 24b, apertured at 30b, which annularly engages and restrains upward flexure of body 17b at 26b, so that when wall 20b is flexed upwardly it tends to urge lip 22b radially inwardly against and into tight annular sealing engagement with shaft 11b. Plates 23b and 24b may be welded to member 12b at 27b.

Fig. 4 illustrates a variational form of the invention which is especially adapted for use as a well swab, for lifting liquid upwardly within a string of well tubing or casing 12c. The swab unit 10c includes a tubular vertically extending body or carrier member 11c which is attached to the lower end of a string of tubing or rods, or in certain cases a wire line, and which is adapted to be vertically moved within the outer tubing or casing 12c. On the down stroke of the swab, the well liquid passes upwardly through carrier 11c past a check valve 13c and out lateral openings 14c in the wall of the tubular carrier to the upper side of the swab structure. On a subsequent up-stroke of the apparatus, check valve 13c rests against a seat 15c to prevent reverse downflow of the liquid through carrier 11c, so that the liquid is raised by the swabbing unit.

The swabbing structure includes a rigid ring 16c which is a pressed fit on tubular carrier 11c, and to whose outer serrated surface an annular elastomeric body 17c is bonded. This body 17c is shaped much like body 17 of Fig. 1, except that the essentially radial wall 20c of Fig. 4 bows in a direction the reverse of that in Fig. 1 as the wall extends radially outwardly, so that the convex surface of the wall is at its upper side, and the concave surface is at its underside. Body 17c has an outer portion 21c which is less free than wall 20c for downward flexure, and which carries a peripheral lip 22c engaging tubing 12c. At its underside, body 17c is backed up by a rigid plate 23c, shaped the same as plate 23 of Fig. 1 and containing apertures 29c communicating with the annular recess in body 17c. Plate 23c may be rigidly secured to carrier 11c by welding at 32c.

Downward flexure of wall 20c in Fig. 4 is resisted both by the resilience of the material of that body, and by a specially formed element 25c embedded in the elastic body and formed of spring steel or other spring material. This spring element 25c has an annular essentially radially extending portion contained within and bowed essentially in correspondence with the essentially radial flexible wall 20c of body 17c. At its inner edge, spring 25c may be backed up against downward flexure by engagement with an annular transverse shoulder 30c on ring 16c. At its outer extremity, spring 25c may have a flange portion 31c turned axially within portion 21c of body 17c and into engagement with backing plate 23c to retain flange 31c against axial flexure. The main radially extending portion of spring 25c may in some instances be imperforate, or in other cases may be apertured or of suitable webbed configuration to reduce its resistance to axial flexure.

When the swab of Fig. 4 is being lowered within the tubing or casing 12c, the pressure at the underside of wall 20c tends to be greater than that at its upper side, to increase the bow of that wall and thus tend to pull lip 22c in a direction radially inwardly away from tight engagement with tubing 12c. Thus, the unit may be lowered within the well relatively freely. On the reverse or upstroke of the swab structure, the fluid pressure at the upper side of wall 20c is of course considerably greater than that at its underside, to thus flex wall 20c downwardly in a manner decreasing its bow and thus forcing lip 22c into tight sealing engagement with tubing 12c. The resistance offered by spring 25c to such flexure acts to prevent overflexing of wall 20c.

The Fig. 4 swab is of course intended to be used in instances in which difficulty may be encountered in maintaining a tight enough seal between lip 22c and the tubing or casing being swabbed. Fig. 5 represents another form of swab which is similar to that of Fig. 4, but is used where the primary problem is preventing the pressure differential from causing too tight a sealing engagement between lip 22d and tubing 12d, rather than where the greatest problem is maintaining the seal tight enough. In this Fig. 5 arrangement, the elastomeric body 17d has an essentially radially extending wall 20d which is constructed to be flexed downwardly during a swab up-stroke, but which upon such flexure tends to exert a radially inward force against body portion 21d and lip 22d, rather than a radially outward force. Preferably, wall 20d extends directly radially of the tubular carrier structure 11d. Of course, the outer portion of body 17d of Fig. 5 is backed up against downward flexure by a backing plate 23d. In this arrangement, the downward flexure increases the bow of the radially extending wall, rather than decreasing it, and it is by virtue of this characteristic that the wall acts to pull inwardly against lip 22d.

I claim:

1. A fluid sealing unit of the character described for forming an annular seal with a coacting member relative to which the unit is axially movable, said unit comprising a body of elastomeric material having a portion forming an essentially radially extending elastic wall to be exposed at one side to pressure fluid, there being a space at the opposite side of said wall allowing axial flexure of the wall toward said opposite side by said pressure fluid, said body of elastomeric material having a second portion connected to one radial extremity of said wall and carrying a sealing lip adapted to annularly engage a surface of said coacting member, and means restraining axial flexure of said second portion of the body toward said opposite side to an extent such that said second portion is less free than said wall for axial flexure toward said opposite side, said wall being constructed to tend to increase in radial dimension when flexed toward said opposite side by the pressure fluid and to thereby exert a radial force against said second portion urging it radially against said coacting member, said wall in extending radially being bowed in a direction such that pressure exerted against said one side thereof tends to decrease the bow and thereby to increase the radial dimension of the wall.

2. A fluid sealing unit as recited in claim 1, in which said second portion of the body is connected to the radially inner extremity of said flexible wall and said lip is engageable with a coacting member extending axially through the unit.

3. A fluid sealing unit as recited in claim 1, in which said second portion of the body is connected to the radially outer extremity of said flexible wall and said lip is engageable with a tubular coacting member.

4. A fluid sealing unit of the character described adapted to be relatively moved within and form a seal with a tubular coacting member, comprising an inner carrier structure, a body of elastomeric material carried by and about said carrier structure and having a portion forming an essentially radially extending axially deflectible elastic wall adapted to be exposed at one side to pressure fluid, there being a space at the opposite axial side of said wall allowing axial flexure of the wall toward said opposite side by the pressure fluid, said body of elastomeric material having a second radially outer portion connected to the outer extremity of said wall and carrying a sealing lip adapted to annularly engage a surface of said tubular member, and means restraining axial flexure of said second portion of the body toward said opposite side to an extent such that said second portion is less free than said wall for axial flexure toward said opposite side, said wall being constructed to tend to increase in radial dimension when flexed toward said opposite side by the pressure fluid and to thereby exert a radially outward force against said second portion urging it radially against said coacting member, said restraining means comprising a transverse backing plate carried by and projecting outwardly from said carrier structure and engaged essentially annularly by said outer portion of said body at said opposite side thereof to restrain said flexure thereof but not of said wall.

5. A fluid sealing unit as recited in claim 4, in which said wall in extending radially is bowed in a direction such that pressure exerted against said one side thereof tends to decrease the bow and thereby to increase the radial dimension of the wall.

6. A fluid sealing unit as recited in claim 5, in which said second portion of the elastomeric body is annular and of substantially greater axial thickness than said radial wall and projects in said one axial direction therefrom, there being a second transverse plate carried by said carrier structure at said one side of the body and engaged by said second portion of the body but not said wall, said second plate having a peripheral essentially axial flange portion extending about said second portion of the body, each of said plates containing an aperture for passing pressure fluid past the plate to said wall.

7. A well swab comprising a tubular carrier member adapted to be lowered into a well, a body of elastomeric material carried by said member for lifting fluid in the well and forming a fluid tight seal with a tubular structure disposed thereabout in the well, said body of elastomeric material having a portion forming an essentially radially extending elastic wall to be exposed to greater pressure at its upper side than at its lower side as the swab is moved upwardly in the well, there being a space at the underside of the wall allowing downward flexure thereof in response to said pressure differential, said body having a second portion connected to the outer extremity of said wall and carrying a sealing lip adapted to annularly engage a surface of said tubular structure, and means restraining downward flexure of said second portion of the body to an extent such that said second portion is less free than said wall for downward flexure, whereby said wall tends to apply a generally radial force to said second portion of the body as a result of said downward flexure.

8. A well swab as recited in claim 7, including a check valve preventing downflow of fluid through said tubular carrier member during a swab up-stroke and allowing fluid upflow through said member during a down stroke.

9. A well swab as recited in claim 7, in which said wall is bowed, as it extends radially outwardly, in a direction causing the wall to exert a radially outward force on said second portion of the body to thereby press said lip against said tubular structure during an up-stroke.

10. A well swab as recited in claim 7, in which said wall is constructed to apply a radially inward force to said second portion of the body as a result of said flexure.

11. A well swab as recited in claim 7, in which said second portion of the body extends downwardly to define a recess in said body beneath said wall, said restraining means comprising a transverse backing member at the underside of said body having a peripheral flange extending upwardly at the outside of said second portion of the body.

12. A fluid sealing unit of the character described for forming an annular seal with a coacting member relative to which the unit is axially movable, said unit comprising a body of elastomeric material having a portion forming an essentially radially extending elastic wall to be exposed at one side to pressure fluid, there being a space at the opposite side of said wall allowing axial flexure of the wall toward said opposite side by said pressure fluid, said body of elastomeric material having a second portion connected to one radial extremity of said wall and carrying a sealing lip adapted to annularly engage a surface of said coacting member, means restraining axial flexure of said second portion of the body toward said opposite side to an extent such that said second portion is less free than said wall for axial flexure toward said opposite side, said wall being constructed to apply a generally radial component of force to said second portion of the body as a result of said flexure to thereby control the engagement between said lip and said coacting member, there being a resilient spring member in addition to said body and yieldingly resisting flexure of said wall toward said opposite side.

13. A fluid sealing unit as recited in claim 12, in which said spring member comprises a leaf spring embedded in the elastomeric material of said body.

14. A fluid sealing unit of the character described for forming an annular seal with a coacting member relative to which the unit is axially movable, said unit comprising a body of elastomeric material having a portion forming an essentially radially extending elastic wall to be exposed at one side to pressure fluid, there being a space at the opposite side of said wall allowing axial flexure of the wall toward said opposite side by said pressure fluid, said body of elastomeric material having a second portion connected to one radial extremity of said wall and carrying a sealing lip adapted to annularly engage a surface of said coacting member, and means restraining axial flexure of said second portion of the body toward said opposite side to an extent such that said second portion is less free than said wall for axial flexure toward said opposite side, said wall being constructed to tend to increase in radial dimension when flexed toward said opposite side by the pressure fluid and to thereby exert a radial force against said second portion urging it radially against said coacting member, said restraining means comprising a backing member at said second side of the elastomeric body engaged by and restraining axial flexure of said second portion of the body toward said opposite side.

15. A fluid sealing unit of the character described for forming an annular seal with a coacting member relative to which the unit is axially movable, said unit comprising a body of elastomeric material having a portion forming an essentially radially extending elastic wall to be exposed at one side to pressure fluid, there being a space at the opposite side of said wall allowing axial flexure of the wall toward said opposite side by said pressure fluid, said body of elastomeric material having a second portion connected to one radial extremity of said wall and carrying a sealing lip adapted to annularly engage a surface of said coacting member, and means restraining axial flexure of said second portion of the body toward said opposite side to an extent such that said second portion is less free than said wall for axial flexure toward said opposite side, said wall being constructed to tend to increase in radial dimension when flexed toward said opposite side by the pressure fluid and to thereby exert a radial force against said second portion urging it radially against said coacting member, said second portion of the elastomeric body being of substantially greater axial thickness than said radial wall.

16. A fluid sealing unit of the character described for forming an annular seal with a coacting member relative to which the unit is axially movable, said unit comprising a body of elastomeric material having a portion forming an essentially radially extending elastic wall to be exposed at one side to pressure fluid, there being a space at the opposite side of said wall allowing axial flexure of the wall toward said opposite side by said pressure fluid, said body of elastomeric material having a second portion connected to one radial extremity of said wall and carrying a sealing lip adapted to annularly engage a surface of said coacting member, and means restraining axial flexure of said second portion of the body toward said opposite side to an extent such that said second portion is less free than said wall for axial flexure toward said opposite side, said wall being constructed to tend to increase in radial dimension when flexed toward said opposite side by the pressure fluid and to thereby exert a radial force against said second portion urging it radially against said coacting member, said second portion of the elastomeric body being annular and of substantially greater axial thickness than said radial wall and projecting in said one axial direction, there being a transverse plate engaging said second portion of the body at said opposite side of the body.

17. A fluid sealing unit of the character described adapted to be relatively moved within and form a seal with a tubular coacting member, comprising an inner carrier structure, a body of elastomeric material carried by and about said carrier structure and having a portion forming an essentially radially extending axially deflectible elastic wall adopted to be exposed at one side to pressure fluid, there being a space at the opposite axial side of said wall allowing axial flexure of the wall toward said opposite side by the pressure fluid, said body of elastomeric material having a second radially outer portion connected to the outer extremity of said wall and carrying a sealing lip adapted to annularly engage a surface of said tubular member, and means restraining axial flexure of said second portion of the body toward said opposite side to an extent such that said second portion is less free than said wall for axial flexure toward said opposite side, said wall being constructed to tend to increase in radial dimension when flexed toward said opposite side by the pressure fluid and to thereby exert a radially outward force against said second portion urging it radially against said coacting member, said wall in extending radially being bowed in a direction such that pressure exerted against said one side thereof tends to decrease the bow and thereby to increase the radial dimension of the wall.

References Cited in the file of this patent
UNITED STATES PATENTS

| 1,626,614 | Kibele | May 3, 1927 |
| 2,709,118 | Martin | May 24, 1955 |